United States Patent [19]

Shoge

[11] Patent Number: 5,562,563
[45] Date of Patent: Oct. 8, 1996

[54] CONTROL SYSTEM FOR A WORKING APPARATUS FOR USE ON A BICYCLE

[75] Inventor: Akihiko Shoge, Shimonoseki, Japan

[73] Assignee: Shimano, Inc., Osaka, Japan

[21] Appl. No.: 357,603

[22] Filed: Dec. 13, 1994

[30] Foreign Application Priority Data

Dec. 16, 1993 [JP] Japan .................... 5-316237

[51] Int. Cl.$^6$ .................... F16H 3/44
[52] U.S. Cl. .................... 475/298; 475/289; 475/312
[58] Field of Search .................... 475/289, 288, 475/314, 299, 298, 300, 311, 312; 74/617, 500.5, 501.5 R, 502, 502.2, 502.5, 489

[56] References Cited

U.S. PATENT DOCUMENTS

| | | | |
|---|---|---|---|
| 4,934,503 | 6/1990 | Bacher et al. | 74/501.5 R X |
| 4,973,297 | 11/1990 | Bergles | 475/289 X |
| 5,078,664 | 1/1992 | Nagano | 475/314 |
| 5,186,072 | 2/1993 | Nagano | 74/501.5 R |
| 5,273,500 | 12/1993 | Nagano . | |
| 5,322,487 | 6/1994 | Nagano | 475/297 |
| 5,325,735 | 7/1994 | Nagano | 74/502.2 |
| 5,443,279 | 8/1995 | Nürnberger | 475/298 X |

FOREIGN PATENT DOCUMENTS

| | | |
|---|---|---|
| 0531608 | 3/1993 | European Pat. Off. . |
| 54-93535 | 7/1979 | Japan . |
| 1494895 | 12/1977 | United Kingdom . |

*Primary Examiner*—Charles A. Marmor
*Assistant Examiner*—Peter Kwon
*Attorney, Agent, or Firm*—James A. Deland

[57] ABSTRACT

A control system for a working apparatus such as a derailleur or self-contained change speed apparatus of a bicycle, operable by a pulling force and a restoring force. This control system comprises a first sleeve shiftable in one direction by the pulling force, and in the other direction by the restoring force; a second sleeve for transmitting a shift of the first sleeve to a controlled member of the change speed apparatus to control the controlled member, the first sleeve and the second sleeve being interlocked to be shiftable relative to each other; a clutch pawl switchable between a first position to transmit rotational drive of the bicycle to the second sleeve, and a second position to break drive transmission; and a clutch controller for switching the clutch pawl to the first position in response to a relative shift between the first sleeve and the second sleeve.

13 Claims, 9 Drawing Sheets

| position of shifter sleeve (31) | speed stage | clutch pawls (16) | first sun pawls (21a) | second sun pawls (22a) | third sun pawls (23a) | fourth sun pawls (24a) |
|---|---|---|---|---|---|---|
| 7th speed position | 7th | engaged | — | ○ | — | — |
| 6th speed position | 6th | engaged | ○ | × | — | — |
| 5th speed position | 5th | disengaged | — | ○ | ○ | — |
| 4th speed position | 4th | engaged | × | × | — | — |
| 3rd speed position | 3rd | disengaged | ○ | × | × | ○ |
| 2nd speed position | 2nd | disengaged | × | × | ○ | — |
| 1st speed position | 1st | disengaged | × | × | × | ○ |

CONTROL SYSTEM FOR A WORKING APPARATUS FOR USE ON A BICYCLE

BACKGROUND OF THE INVENTION

1. Field of the Invention

The present invention relates to a control system for controlling a working apparatus, particularly a change speed apparatus, for use on a bicycle, which control system is reciprocally operable by a pulling force and a restoring force.

2. Description of the Related Art

As a known type of change speed apparatus for a bicycle, a self-contained change speed apparatus is disclosed in U.S. Pat. No. 5,273,500, for example. This change speed apparatus has a fixed shaft rotatably supporting a drive member and a hub body, and a drive transmitting mechanism for transmitting torque from the drive member to the hub body in varied speeds. The drive transmitting mechanism includes four sun gears rotatably mounted on the fixed shaft, a pair of planet gears meshed with each sun gear, a clutch mechanism for transmitting torque from the drive member to a carder of one pair of planet gears, transmission pawls for transmitting torque from a ring gear meshed with the other pair of planet gears to the hub body, and transmission pawls for transmitting torque from a carder supporting the other pair of planet gears to the hub body.

The fixed shaft further supports a shifter sleeve mounted thereon to be rotatable in opposite directions. The shifter sleeve is rotatable in one direction by a pulling force exerted through a control cable, and in the other direction by a force of a return spring. The shifter sleeve defines control sections for engaging and disengaging the clutch mechanism and for locking and unlocking the four sun gears. Each sun gear has sun pawls engageable with projections formed on the fixed shaft. The control sections of the shifter sleeve cause the sun pawls to engage the projections, thereby to lock the sun gears, or to mount the projections, thereby to unlock and allow rotation of the sun gears. In this way, the self-contained speed change apparatus transmits torque from the drive member to the hub body in seven, a first to a seventh, speed stages.

A relatively strong operating force is required to switch the sun pawls from a lock position to an unlock position since the sun pawls must be disengaged from the projections on the fixed shaft. A strong shifting force is required particularly when a large driving load is applied during a run, for example, to maintain the sun pawls rigidly engaged with the projections on the fixed shaft. In conventional practice, therefore, a relatively strong return spring is used to realize a smooth shifting operation based on the force of the return spring against the rigid engagement between the sun pawls and the projections on the fixed shaft. However, a shifting operation carded out by pulling the control cable requires a strong force to overcome the strong return spring.

SUMMARY OF THE INVENTION

The object of the present invention is to provide an improved control system for controlling a working apparatus used on a bicycle, which is switchable by a pulling force of and a restoring force, the improved control system assuring a reliable switching operation while allowing a relatively light switching operation to be carried out.

The above object is fulfilled, according to the present invention, by a control system comprising:

a first shift member shiftable in one direction by a pulling force, and in the other direction by a restoring force;

a second shift member for transmitting a shift of the first shift member to a controlled member of a working apparatus to control the controlled member, the first shift member and the second shift member being interlocked to be shiftable relative to each other;

clutch means switchable between a first position to transmit rotational drive of the bicycle as a restoring force to the second shift member, and a second position to break drive transmission; and clutch control means for switching the clutch means to the first position in response to a relative shift between the first shift member and the second shift member.

With the above control system, when the restoring force is exerted, the controlled member of the working apparatus may not move sufficiently or may not move at all. Then, the second shift member also does not move sufficiently or does not move at all. In such a case, the first shift member is capable of a return movement. A relative shift occurring at this time between the first shift member and second shift member is utilized to engage the clutch to transmit rotational drive of the bicycle as a restoring force to the second shift member. In this way, the second shift member derives a strong restoring force to facilitate control of the controlled member of the working apparatus in a condition difficult to control. With the rotational drive of the bicycle acting on the second shift member, a shifting operation eliminates the relative shift between the first shift member and second shift member to disengage the clutch.

A self-contained change speed apparatus is a first conceivable application for the control system according to the present invention. In this case, the clutch means and clutch control means may be arranged outwardly or inwardly of a drive member of the self-contained change speed apparatus. The former may be achieved with little or no modification made to a conventional construction. The latter results in a rather complicated construction but provides an advantage of avoiding direct exposure to mud and water of the clutch means and clutch control means. This hardly requires a change in size of the self-contained change speed apparatus as a whole.

Other features and advantages of the present invention will be apparent from the following description of the preferred embodiments to be had with reference to the drawings.

BRIEF DESCRIPTION OF THE DRAWINGS

3

FIG. 7A is a view, partly in section, of a clutch pawl control mechanism with a clutch pawl in OFF position.

FIG. 7A is a view, partly in section, of the clutch pawl control mechanism with the clutch pawl in ON position.

DETAILED DESCRIPTION OF THE PREFERRED EMBODIMENTS

Figure 1:
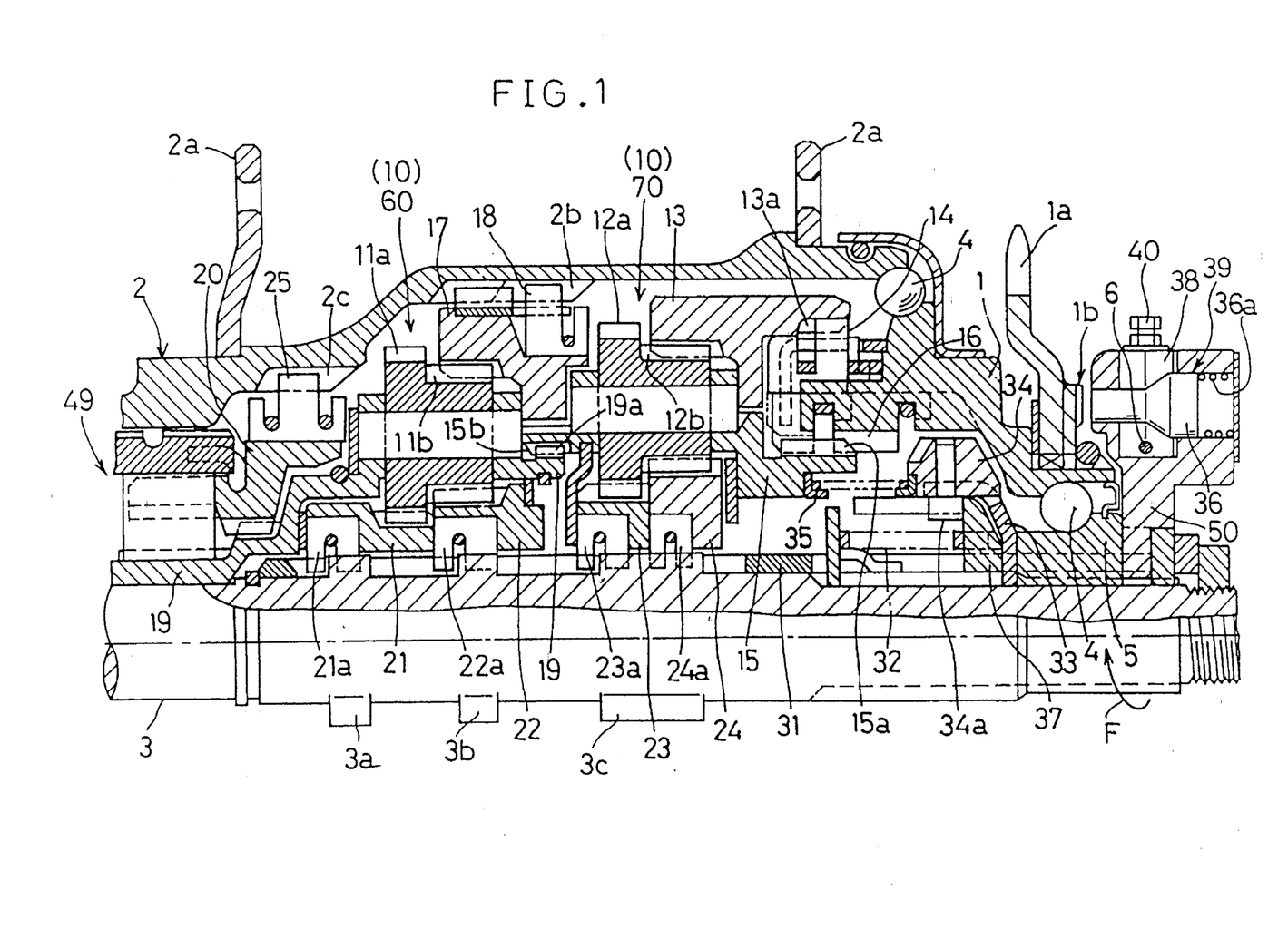
FIG. 1 is a sectional view of a self-contained change speed apparatus employing a control system in a first embodiment of the present invention.

FIG. 1 shows a self-contained change speed apparatus employing a control system in a first embodiment of the present invention. This change speed apparatus includes a drive member 1 having a chainwheel 1a on which a bicycle driving chain (not shown) is wound to drive the drive member 1 in a rotating direction F (hereinafter called clockwise also), a hub body 2 having hub flanges 2a to which wheel spokes (not shown) are connected, and a drive transmission mechanism 10 for transmitting torque from the drive member 1 to the hub body 2. These components are rotatably mounted on a fixed shaft 3 secured to a bicycle frame, through balls 4 and a ball presser 5. The drive transmission mechanism 10 includes two, a first and a second, planetary gear mechanisms 60 and 70 for transmitting torque from the drive member 1 to the hub body 2 in seven speed stages.

The first planetary gear mechanism 60 includes a first gear carrier 19 relatively unrotatably engaged with a relay member 20 provided in a region of a coaster brake 49. The first planetary gear mechanism 60 further includes a first and a second sun gears 21 and 22 supported on the fixed shaft 3 to be rotatable independently of each other and axially immovable. The first and second sun gears 21 and 22, respectively, are meshed with first and second planet gears 11a and 11b, each pair of first and second planet gears being formed integral as a double gear having different diameters and supported by a first gear carrier 19. The second planet gears 11b are meshed also with a first ring gear 17. The second planetary gear mechanism 70 includes a second gear carrier 15 splined to the first gear carrier 19 to be unrotatable relative to each other. The second planetary gear mechanism 70 further includes a third and a fourth sun gears 23 and 24 supported on the fixed shaft 1 to be rotatable independently of each other and axially immovable. The third and fourth sun gears 23 and 24, respectively, are meshed with third and fourth planet gears 12a and 12b, each pair of third and fourth planet gears being formed integral as a double gear having different diameters and supported by the second gear carrier 15. The fourth planet gears 12b are meshed also with a second ring gear 13.

Selective free wheeling and locking controls of the sun gears 21, 22, 23 and 24 relative to the fixed shaft 3 are carded out by a shifter sleeve 31 as described in detail later.

The first ring gear 17 and relay member 20 are selectively used as an output element of the drive transmission mechanism 10 to act on the hub body 2. The second ring gear 13 and second gear carder 15 are selectively used as an input element to receive drive from the drive member 1. One-way clutches are employed to effect selective drive transmission between these components. Specifically, output one-way clutches include a first transmission clutch 25 provided between the relay member 20 and hub body 2, and a second transmission clutch 18 provided between the first ring gear 17 and hub body 2. Input one-way clutches include a third transmission clutch 16 provided between the second gear carder 15 and drive member 1, and a fourth transmission clutch 14 provided between the second ring gear 13 and drive member 1. These one-way clutches are in the form of ratchet pawls for engaging ratchet teeth. That is, first to fourth transmission pawls 25, 18, 16 and 14 acting as the clutches are constantly spring-loaded for engagement with corresponding ratchet teeth 2c, 2b, 15a and 13a. The first transmission pawls 25 are attached to the relay member 20, the second transmission pawls 18 to the first ring gear 17, and the third and fourth transmission pawls 16 and 14 to the drive member 1. The transmission pawls 25, 18, 16 and 14 are oriented such that the hub body 2, second gear carrier 15 or second ring gear 13 is driven only when the components carrying the pawls are rotated in the direction of arrow F in FIG. 1. The third transmission pawls 16 are meshed with the third transmission teeth 15a over an entire width thereof. The third transmission pawls 16 acting as the third transmission clutch are operable by a clutch controller 34 described later.

The fourth transmission pawls 14 are biased to erected engaging positions by pawl springs (not shown) to transmit torque from the drive member 1 to the ring gear 13 and to permit the ring gear 13 to rotate ahead of the drive member 1. The second transmission pawls 18 are biased to erected engaging positions by pawl springs (not shown) to transmit torque from the ring gear 17 to the hub body 2. The first transmission pawls 25 are biased to erected engaging positions by pawl springs (not shown) to transmit torque from the relay member 20 to the hub body 2 and to permit the hub body 2 to rotate faster than and ahead of the relay member 20.

The third transmission pawls 16 are biased to erected engaging positions by pawl springs (not shown) to transmit torque from the drive member 1 to the carrier 15. The third transmission pawls 16 break this torque transmission when in a disengaged position. The first gear carder 19 and second gear carder 15 are engaged with each other through teeth 15a and 19a to be rotatable together.

As shown in FIG. 1, first to fourth sun pawls 21a, 22a, 23a and 24a are arranged between the fixed shaft 3 and the first to fourth sun gears 21, 22, 23 and 24, respectively. These sun pawls 21a, 22a, 23a and 24a are pivotably attached to inner peripheral walls of the sun gears and constantly biased toward the fixed shaft 3 to act as one-way clutches. The fixed shaft 3 defines first restrotor projections 3a engageable with the first sun pawls 21a, second restrictor projections 3b engageable with the second sun pawls 22a, and third restrictor projections 3c engageable with both the third and fourth sun pawls 23a and 24a. These sun pawls and restrotor projections are cooperable to prevent the respective sun gears from rotating in one direction around the fixed shaft 3. The first and second sun pawls 21a and 22a allow rotation opposite of the driving direction F relative to the fixed shaft 3. The third and fourth sun pawls 23a and 24a allow rotation in the driving direction F relative to the fixed shaft 3. The first sun gear 21 has a small diameter, and includes a boss extending leftward for supporting the first sun pawls 21a.

The self-contained change speed apparatus provides the seven speed stages as follows.

Figure 2:
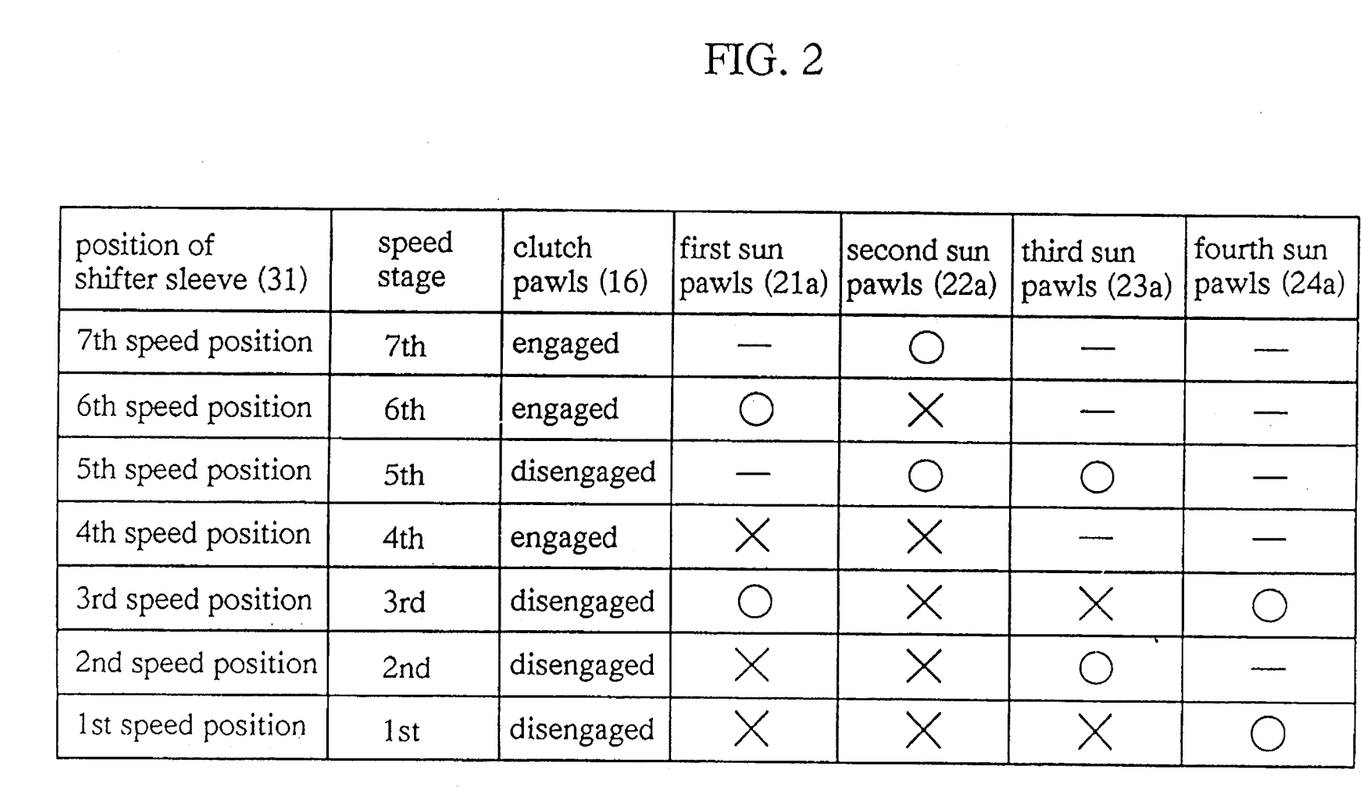
FIG. 2 is an explanatory view showing relationships between sun pawls and speed stages.

As summarized in FIG. 2, the seventh speed is provided when the third transmission pawls 16 are engaged, the first sun pawls 21a are left untouched, the second sun pawls 22a are locked, the third sun pawls 23a are left untouched and the fourth sun pawls 24a are left untouched. Then, torque is transmitted from the drive member 1 to the hub body 2 through the third transmission pawls 16, carriers 15 and 19, first planet gears 11, ring gear 17 and second transmission pawls 18.

The sixth speed is provided when the third transmission pawls 16 are engaged, the first sun pawls 21a are locked, the second sun pawls 22a are unlocked, the third sun pawls 23a are left untouched and the fourth sun pawls 24a are left untouched. Then, torque is transmitted from the drive member 1 to the hub body 2 through the third transmission pawls 16, carriers 15 and 19, first planet gears 11, ring gear 17 and second transmission pawls 18.

The fifth speed is provided when the third transmission pawls 16 are disengaged, the first sun pawls 21a are left untouched, the second sun pawls 22a are locked, the third sun pawls 23a are locked and the fourth sun pawls 24a are left untouched. Then, torque is transmitted from the drive member 1 to the hub body 2 through the fourth transmission pawls 14, ring gear 13, second planet gears 12, carriers 15 and 19, first planet gears 11, ring gear 17 and second transmission pawls 18.

The fourth speed is provided when the third transmission pawls 16 are engaged, the first sun pawls 21a are unlocked, the second sun pawls 22a are unlocked, the third sun pawls 23a are left untouched and the fourth sun pawls 24a are left untouched. Then, torque is transmitted from the drive member 1 to the hub body 2 through the third transmission pawls 16, carriers 15 and 19, relay member 20 and first transmission pawls 25.

The third speed is provided when the third transmission pawls 16 are disengaged, the first sun pawls 21a are locked, the second sun pawls 22a are unlocked, the third sun pawls 23a are unlocked and the fourth sun pawls 24a are locked. Then, torque is transmitted from the drive member 1 to the hub body 2 through the fourth transmission pawls 14, ring gear 13, second planet gears 12, carriers 15 and 19, first planet gears 11, ring gear 17 and second transmission pawls 18.

The second speed is provided when the third transmission pawls 16 are disengaged, the first sun pawls 21a are unlocked, the second sun pawls 22a are unlocked, the third sun pawls 23a are locked and the fourth sun pawls 24a are left untouched. Then, torque is transmitted from the drive member 1 to the hub body 2 through the fourth transmission pawls 14, ring gear 13, second planet gears 12, carriers 15 and 19 and first transmission pawls 25.

The first speed is provided when the third transmission pawls 16 are disengaged, the first sun pawls 21a are unlocked, the second sun pawls 22a are unlocked, the third sun pawls 23a are unlocked and the fourth sun pawls 24a are locked. Then, torque is transmitted from the drive member 1 to the hub body 2 through the fourth transmission pawls 14, ring gear 13, second planet gears 12, carriers 15 and 19, relay member 20 and first transmission pawls 25.

The shift control system in which the shifter sleeve 31 plays a central role will now be described in detail.

The control system includes the shifter sleeve 31 mounted on the fixed shaft 3 to be rotatable in opposite directions, a return spring 32 mounted inwardly of the ball presser 5 to bias the shifter sleeve 31 in a backward rotating direction, the clutch controller 34 supported by the fixed shaft 3 through a support member 33 adjacent the ball presser 5, a return spring 35 acting on the clutch controller 34, and a pin type clutch pawl 36 attached to a control ring 50 mounted on an end of the shifter sleeve 31 extending from the ball presser 5 laterally outwardly of the hub. Further, the control ring 50 has a wire connector 38 acting as a clutch pawl control mechanism 39 which is a characterizing feature of the present invention.

Figure 3A:
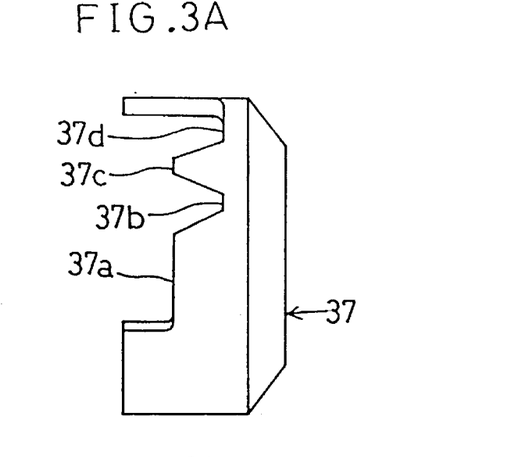
FIG. 3A is a side view of a control element interlocked to a shifter sleeve.
Figure 3B:
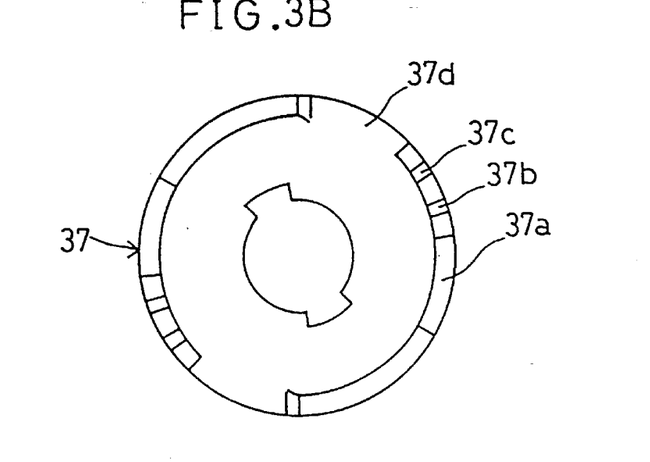
FIG. 3B is a front view of the control element.

The shifter sleeve 31 is rotatable clockwise and counterclockwise about the axis of the fixed shaft 3, to switch among seven positions from a first speed position at one stroke end to a seventh speed position at the other stroke end. A control element 37 (FIGS. 3A and 3B) is fitted on the shifter sleeve 31 to be rotatable together. When the shifter sleeve 31 is in the first to third speed positions, a first control position 37a of the control element 37 contacts a control pin 34a of the clutch controller 34. Then, the first control position 37a causes the clutch controller 34 to slide along a guide on the support member 33 against the return spring 35. Cam portions of the clutch controller 34 thereby contact ends of the third transmission pawls 16 to knock down the third transmission pawls 16 toward the drive member 1. As a result, the shifter sleeve 31 has now disengaged the third transmission pawls 16. When the shifter sleeve 31 moves to the fourth speed position, a second control position 37b provided by a bottom of a cutout in the control element 37 is opposed to the control pin 34a of the clutch controller 34. Then, the clutch controller 34 slides away from the third transmission pawls 16 under the elastic restoring force of return spring 35, whereupon the third transmission pawls 16 are engaged under the biasing force of the pawl springs. As a result, the shifter sleeve 31 has now engaged the third transmission pawls 16. When the shifter sleeve 31 moves to the fifth speed position, a third control position 37c of the control element 37 contacts the control pin 34a, causing the clutch controller 34 to slide against the return spring 35. The cam portions of the clutch controller 34 thereby contact the ends of the third transmission pawls 16 to knock down the third transmission pawls 16 toward the drive member 1. As a result, the shifter sleeve 31 has disengaged the third transmission pawls 16. When the shifter sleeve 31 moves to the sixth and seventh speed positions, a fourth control position 37d provided by a bottom of a cutout in the control element 37 is opposed to the control pin 34a. Then, the clutch controller 34 slides away from the third transmission pawls 16 under the force of return spring 35, whereupon the third transmission pawls 16 are engaged under the biasing force of the pawl springs. As a result, the shifter sleeve 31 has engaged the third transmission pawls 16.

Figure 4:
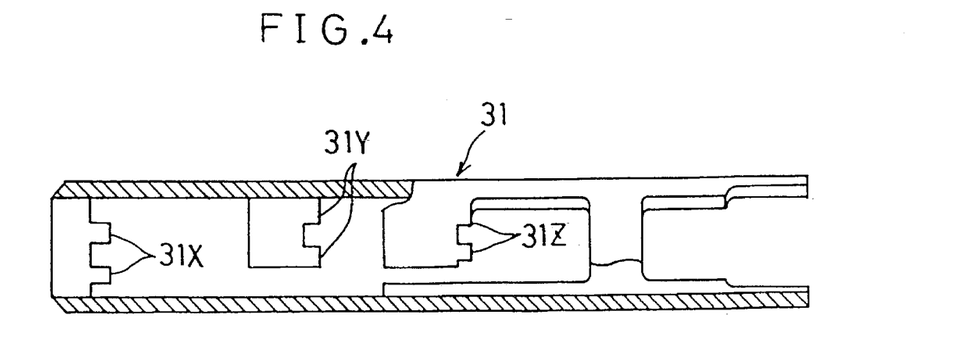
FIG. 4 is an explanatory view, partly broken away, of the shifter sleeve.
Figures 5A, 5B:
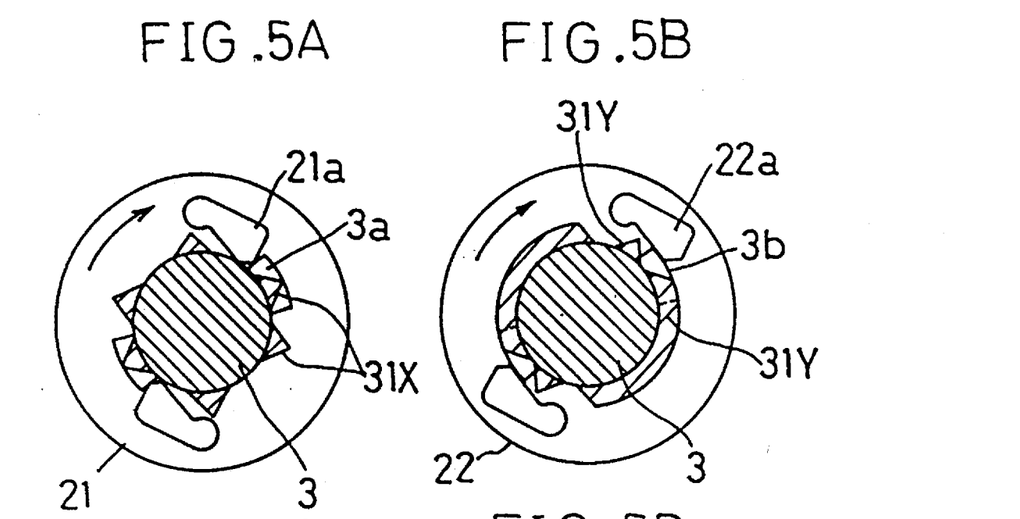
FIGS. 5A through 5D are sectional views showing positional relationships between the shifter sleeve and respective sun pawls in a sixth speed condition.
Figure 5C:
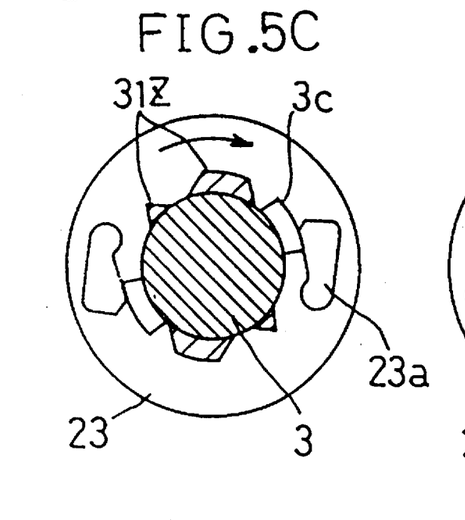
Figure 5D:
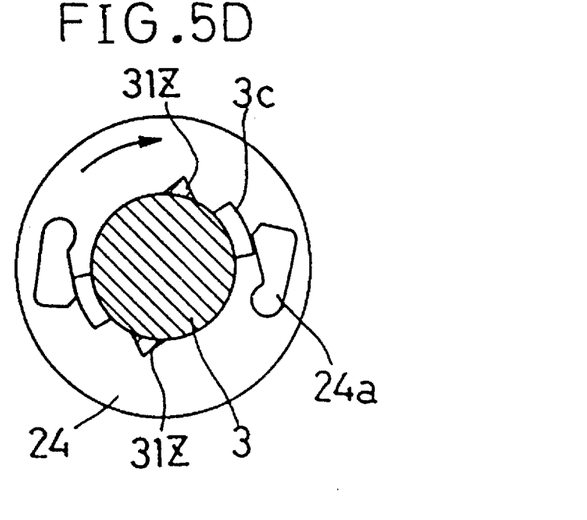

As shown in FIG. 4, the shifter sleeve 31 defines a first control section 31X, a second control section 31Y and a third control section 31Z in positions opposed to the sun gears 21–24. With rotation of the shifter sleeve 31, the first control section 31X moves about a fixed axis relative to the first projections 3a of the fixed shaft 3 for enabling the first sun pawls 21a to engage the first projections 3a or for guiding the first sun pawls 21a to mount the first projections 3a. With rotation of the shifter sleeve 31, the second control section 31Y moves about the fixed axis relative to the second projections 3b of the fixed shaft 3 for enabling the second sun pawls 22a to engage the second projections 3b or for guiding the second sun pawls 22a to mount the second projections 3a. With rotation of the shifter sleeve 31, the third control section 31Z moves about the fixed axis relative to the third projections 3c of the fixed shaft 3 for enabling the third sun pawls 23a to engage the third projections 3c or for guiding the third sun pawls 23a to mount the third projections 3c. That is, when the shifter sleeve 31 is in each of the first to seventh speed positions, the control sections 31X, 31Y and 31Z leave the sun pawls 21a–24a untouched, or lock or unlock the sun pawls 21a–24a as shown in FIG. 2. By way of example, FIGS. 5A–5D, show the relationships between the control sections of the shifter sleeve 31 and the four sets of sun pawls when the shifter sleeve 31 is in the sixth speed position. As seen from these figures, parts of the first control section 31X coincide with the first projections 3a, and the other parts thereof are separated from the first projections 3a, with the first sun pawls 21a engaging the first projections 3a. Parts of the second control section 31Y lie adjacent the second projections 3b for guiding the second sun pawls 22a to mount the second projections 3b. The third and fourth sun pawls 23a and 24a are in free rotation and require no control. Reference is made to U.S. Pat. No. 5,273,500 for the relationships between the control sections of the shifter sleeve and the four sets of sun pawls in this type of self-contained change speed apparatus.

Figure 6:
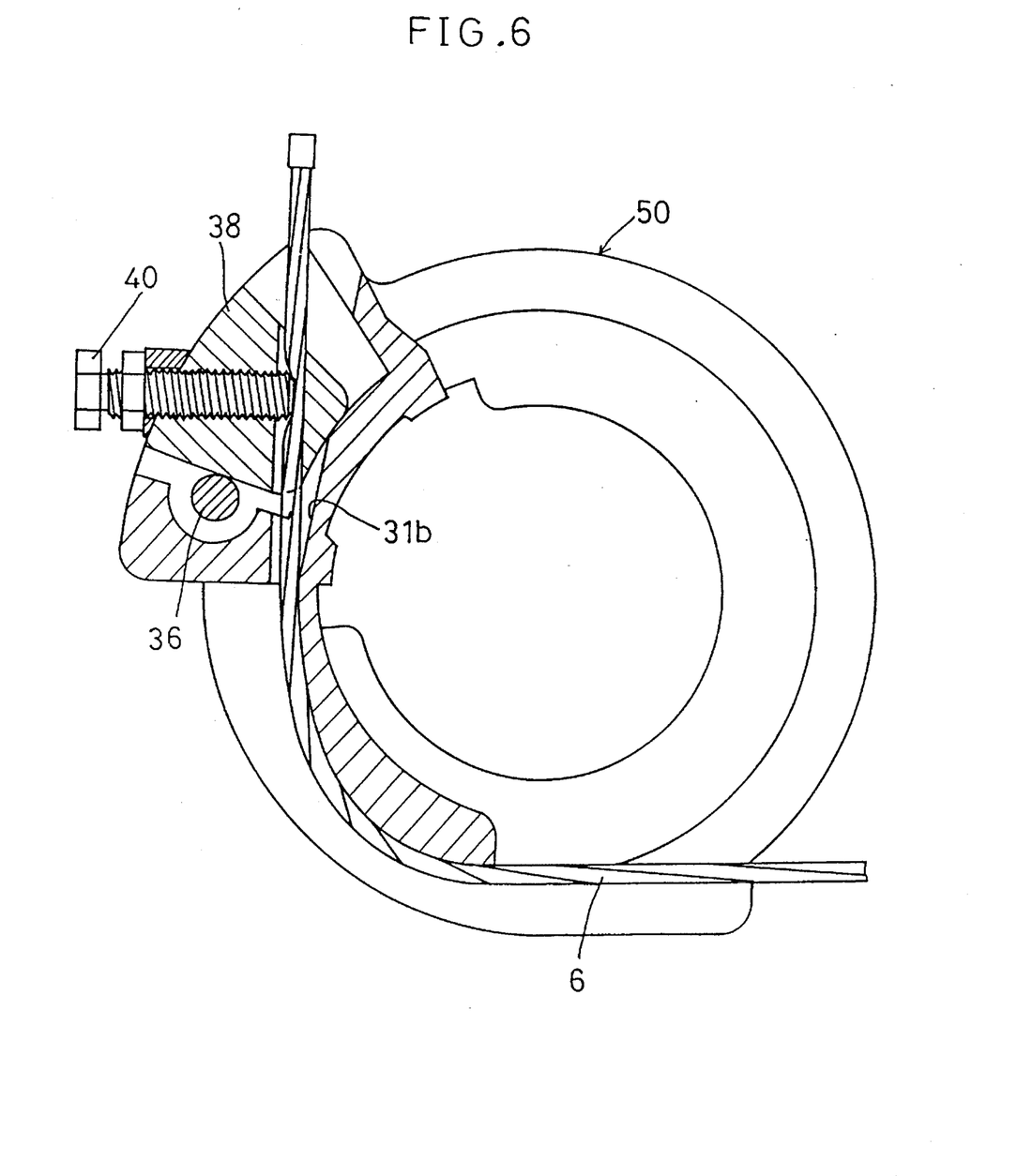
FIG. 6 is a sectional view of an inner wire connecting structure.

As shown in FIG. 6, the control ring 50 connected to the shifter sleeve 31 is formed as a wire pulley for winding thereon an inner wire 6 of a control cable extending from a shift lever device (not shown). An end of the inner wire 6 is passed through a wire receiving bore 31b of the control ring 50 to a wire connecting bore of the wire connector 38. The inner wire 6 is fixed tight to the wire connector 38 by a wire clamp screw 40. The wire connector 38 is mounted in a connector receiving recess of the control ring 50 to be slidable relative to the control ring 50. When the inner wire 6 is pulled and a tension is applied thereto, the wire connector 38 contacts and is supported by the clutch pawl 36 mounted in the control ring 50. Consequently, when the inner wire 6 is pulled, the shifter sleeve 31 rotates counterclockwise. When the inner wire 6 is relaxed, the shifter sleeve 31 rotates clockwise under the torsional elastic restoring force of the return spring 32.

Figures 7A, 7B:
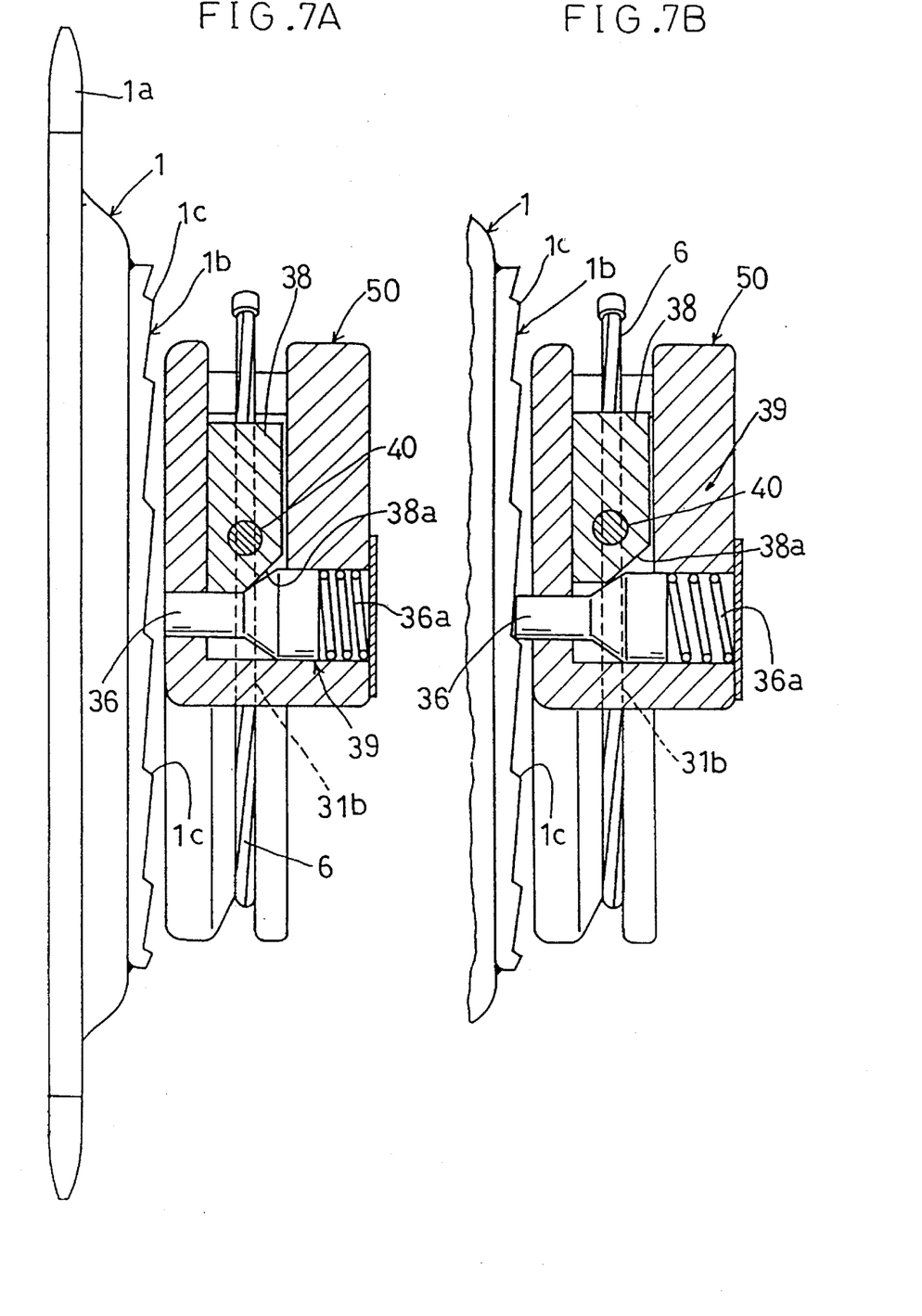

As seen from FIGS. 7A and 7B, the clutch pawl 36 is mounted in the control ring 50 to be slidable along the rotational axis of the shifter sleeve 31. The clutch pawl 36 is biased toward the drive member 1 by a clutch spring 36a mounted in the control ring 50. The clutch pawl 36 is in ON position when the clutch pawl 36 has slid toward the drive member 1 under the force of clutch spring 36a, with a forward end of the clutch pawl 36 placed in engagement with a ridge 1c on a rugged transmission surface 1b formed on an annular member attached to a side surface of the drive member 1 to be rotatable together. In this position, the clutch pawl 36 transmits torque from the drive member 1 to the control ring 50. That is, the torque of the drive member 1 is transmitted as a restoring force to the shifter sleeve 31 to rotate the latter clockwise. The clutch pawl 36 is in OFF position when the clutch pawl 36 has slid toward the control ring 50, to disengage the forward end of the clutch pawl 36 from the ridge 1c on the rugged transmission surface 1b. In this position, the drive member 1 and shifter sleeve 31 are disconnected to be rotatable relative to each other.

The wire connector 38 constituting the clutch control mechanism 39 with the clutch spring 36a includes a cam portion 38a for acting on a conical portion of the clutch pawl 36. When the inner wire 6 is subjected to a tension exceeding a force set as necessary for maintaining the shifter sleeve 31 in each speed position, this tension of the inner wire 6 causes the cam portion 38a of the wire connector 38 to slide the clutch pawl 36 to OFF position against the clutch spring 36a. When the tension of the inner wire 6 falls below the set force, the clutch spring 36a slides the clutch pawl 36 to ON position. The efficiency of the cam portion 38a acting on the clutch pawl 36 and the strength of the clutch spring 36a are determined to realize the above sliding action. That is, as shown in FIG. 7A, when the inner wire 6 is pulled to rotate the shifter sleeve 31 counterclockwise, the tension of the inner wire 6 exceeds the set force whereby the wire connector 38 slides the clutch pawl 36 to OFF position. As a result, the clutch control mechanism 39 detects the tension of the inner wire 6 exceeding the set force, and automatically disengages the clutch pawl 36. Then, even if the inner wire 6 is relaxed to rotate the shifter sleeve 31 clockwise, the return spring 32 or 35 may not rotate the shifter sleeve 31 or may rotate the shifter sleeve 31 in an amount less than an operating stroke of the inner wire 6 because of strong engagement between the sun pawls 21a–23a and fixed shaft 3. In such a case, as shown in FIG. 7B, the inner wire 6 becomes relaxed and its tension falls below the set force. Then, the clutch pawl 36 slides toward the drive member 1, that is, a relative displacement occurs between the wire connector 38 and control ring 50, whereby the clutch pawl 36 engages a ridge 1c. As a result, the clutch control mechanism 39 detects the tension of the inner wire 6 less than the set force, and automatically engages the clutch pawl 36 by producing a relative displacement between the wire connector 38 and control ring 50.

Thus, when the inner wire 6 of the control cable is connected by the wire connector 38 to the control ring 50 of the shifter sleeve 31 and the inner wire 6 is pulled, the tension of the inner wire 6 exceeds the set force whereby the clutch control mechanism 39 automatically disengages the clutch pawl 36 to allow a relative rotation between the shifter sleeve 31 and drive member 1. The pulling force of the inner wire 6 rotates the shifter sleeve 31 counterclockwise to switch the drive transmission mechanism 10 to an accelerating position. When the inner wire 6 is relaxed, the shifter sleeve 31 rotates clockwise under the restoring force of the return spring 32 to switch the drive transmission mechanism 10 to a decelerating position, provided that a shifting resistance is small in the absence of a strong driving load acting on the hub body 2 and the sun pawls 21a–24a and fixed shaft 3 are only weakly engaged. However, the shifter sleeve 31 may not rotate under the force of the return spring 32 in the event of a strong shifting resistance with a strong driving load acting on the hub body 2 to engage the sun pawls 21a–24a and fixed shaft 3 strongly. In such a case, the inner wire 6 becomes relaxed and its tension falls below the set force. Then, the clutch control mechanism 39 automatically engages the clutch pawl 36. Consequently, the torque of the drive member 1 acts as a restoring force to rotate the shifter sleeve 31 in the opposite direction to switch the drive transmission mechanism 10 to a decelerating position. When the shifter sleeve 31 is switched to a new speed position to switch the drive transmission mechanism 10 to a selected speed stage, the shift lever is maintained in a selected shift position after this switching, to keep pulling the inner wire 6 whereby the tension of the inner wire 6 returns to the set force. Consequently, the clutch control mechanism 39 automatically disengages and returns the clutch pawl 36 to disconnect the drive member 1 and shifter sleeve 31, thereby enabling pedal action and a next shifting operation.

Figure 8:
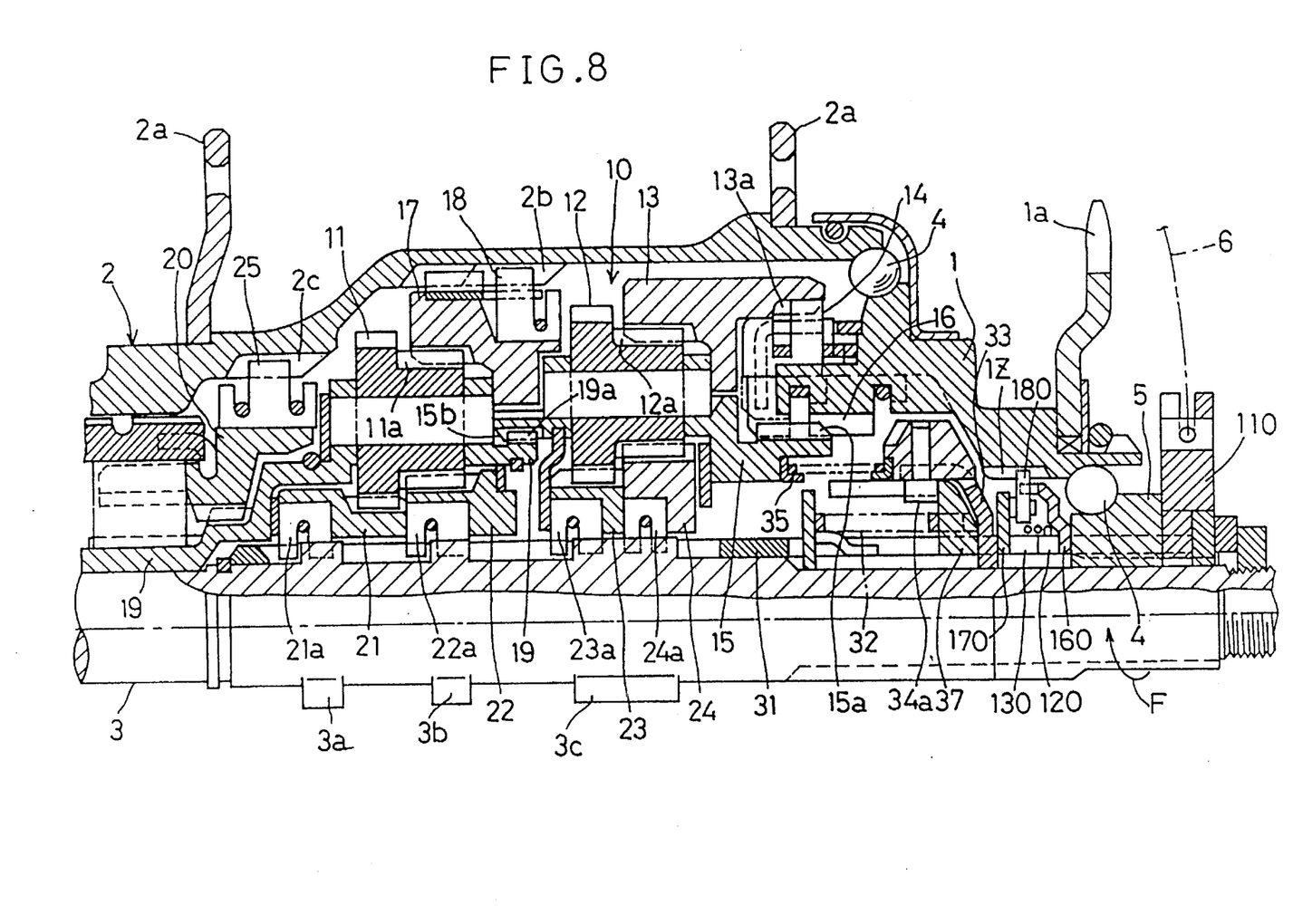
FIG. 8 is a sectional view of a self-contained change speed apparatus employing a control system in a second embodiment of the present invention.

FIG. 8 shows a self-contained change speed apparatus employing a control system in a different embodiment of the present invention. This change speed apparatus includes the same drive transmission mechanism 10 as in the preceding embodiment. Thus, like reference numerals are used to identify like parts which will not be described again to avoid unnecessary repetition. This embodiment differs from the preceding embodiment in that a structure for transmitting torque from the drive member to the shifter sleeve as necessary is disposed inwardly of the drive member.

Figure 9:
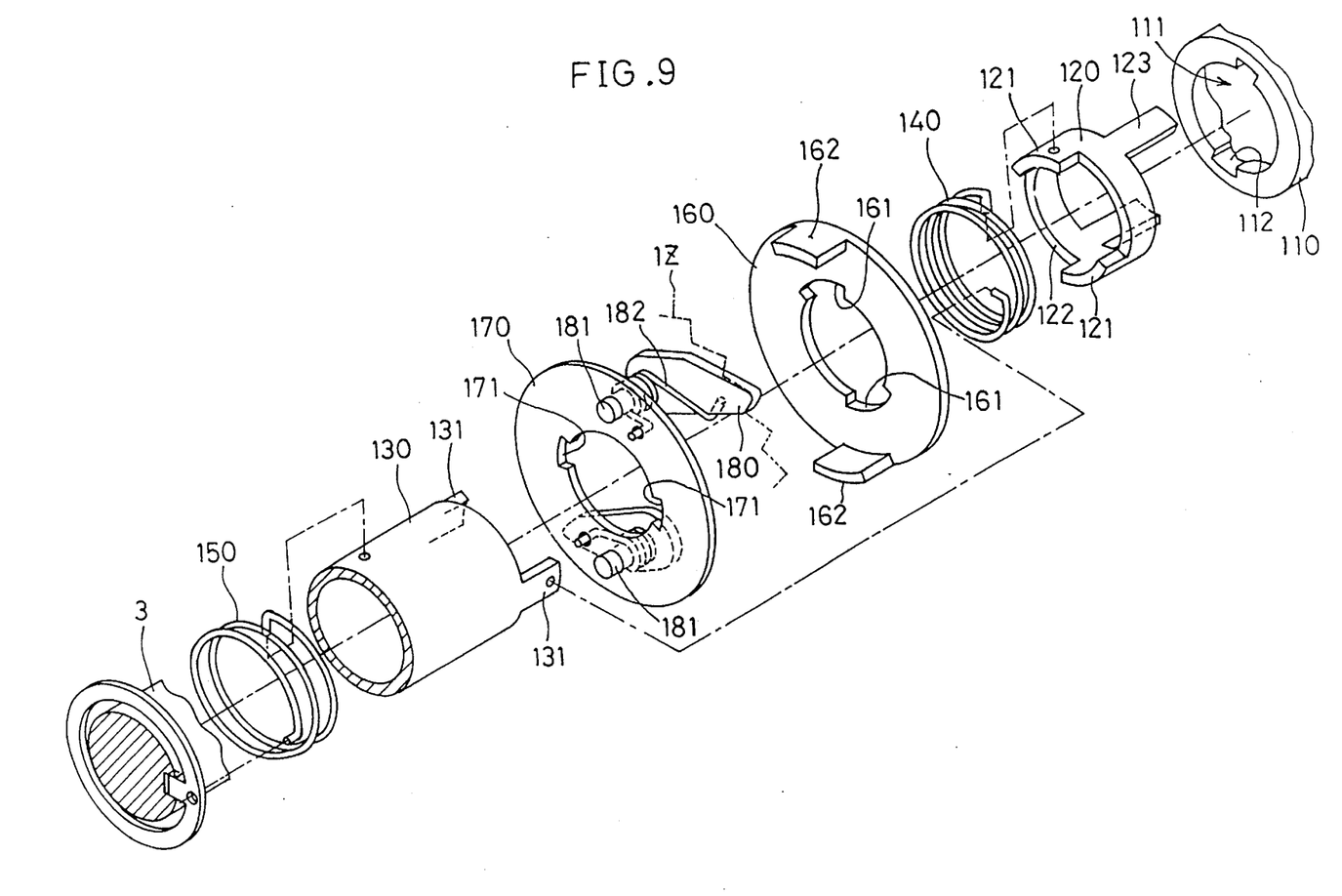
FIG. 9 is an exploded perspective view showing a basic construction of the control system in the second embodiment.

As seen from FIGS. 8 and 9, a pawl control mechanism for controlling the sun pawls and the third transmission pawls 16 includes a control ring 110 formed as a wire pulley to which one end of the inner wire 6 is secured, a first sleeve 120 interlocked at one end thereof to the control ring 110, and a second sleeve 130 interlocked to the other end of the first sleeve 120. The second sleeve 130 basically has the same functions as and has a similar configuration to the shifter sleeve 31 in the preceding embodiment, but is not directly connected to the control ring 110. The control ring 110 defines an axial bore 111 having opposite grooves 112 for receiving axial extensions 123 formed at one end of the first sleeve 120. The first sleeve 120 has recesses 122 formed between two projections 121 at the other end thereof for receiving two projections 131 formed at one end of the second sleeve 130. Consequently, the first sleeve 120 and second sleeve 130 are rotatable together about the fixed shaft 3. The recesses 122 have a greater circumferential length than the projections 131. This allows a relative rotation between the first sleeve 120 and second sleeve 130. An auxiliary return spring 140 is provided to bias the first sleeve 120 and second sleeve 130 in opposite rotating directions. One end of the auxiliary return spring 140 is fixed to a peripheral wall of the first sleeve 120, while the other end thereof is fixed to a peripheral wall of the second sleeve 130. A main return spring 150 is mounted between the second sleeve 130 and fixed shaft 3 for biasing the second sleeve 130 clockwise. The main return spring 150 is stronger than the auxiliary return spring 140. When the inner wire 6 is pulled to rotate the control ring 110 counterclockwise, the first sleeve 120 rotates at the same time. Then, the projections 121 of the first sleeve 120 and the projections 131 of the second sleeve 130 are interconnected to rotate the second sleeve 130 against the main return spring 150, thereby to produce the speed stages as described hereinbefore.

The projections 121 of the first sleeve 120 are engaged in grooves 161 formed in a pawl control disk 160, whereby the pawl control disk 160 is rotatable with the first sleeve 120 about the fixed shaft 3. The pawl control disk 160 includes two pawl pressers 162 extending axially from outer peripheries thereof. The projections 131 of the second sleeve 130 are engaged in grooves 171 formed in a pawl support disk 170, whereby the pawl support disk 170 is rotatable with the second sleeve 130 about the fixed shaft 3. The pawl support disk 170 supports clutch pawls 180 through pivot pins 181 extending parallel to the fixed shaft 3. The clutch pawls 180, when erected, engage teeth 1z formed on inner peripheries of the drive member 1. The clutch pawls 180 are biased to the erected positions by pawl springs 182. As seen from FIG. 10, the clutch pawls 180 and pawl pressers 162 are in such a positional relationship that the pawl pressers 162 press down the clutch pawls 180 against the pawl springs 182 when the inner wire 6 is pulled to rotate the first sleeve 120 counterclockwise and connect the projections 121 of the first sleeve 120 to the projections 131 of the second sleeve 130 to interlock the second sleeve 130 to the first sleeve 120.

The operation of the control system having the above construction will be described below.

Figure 10:
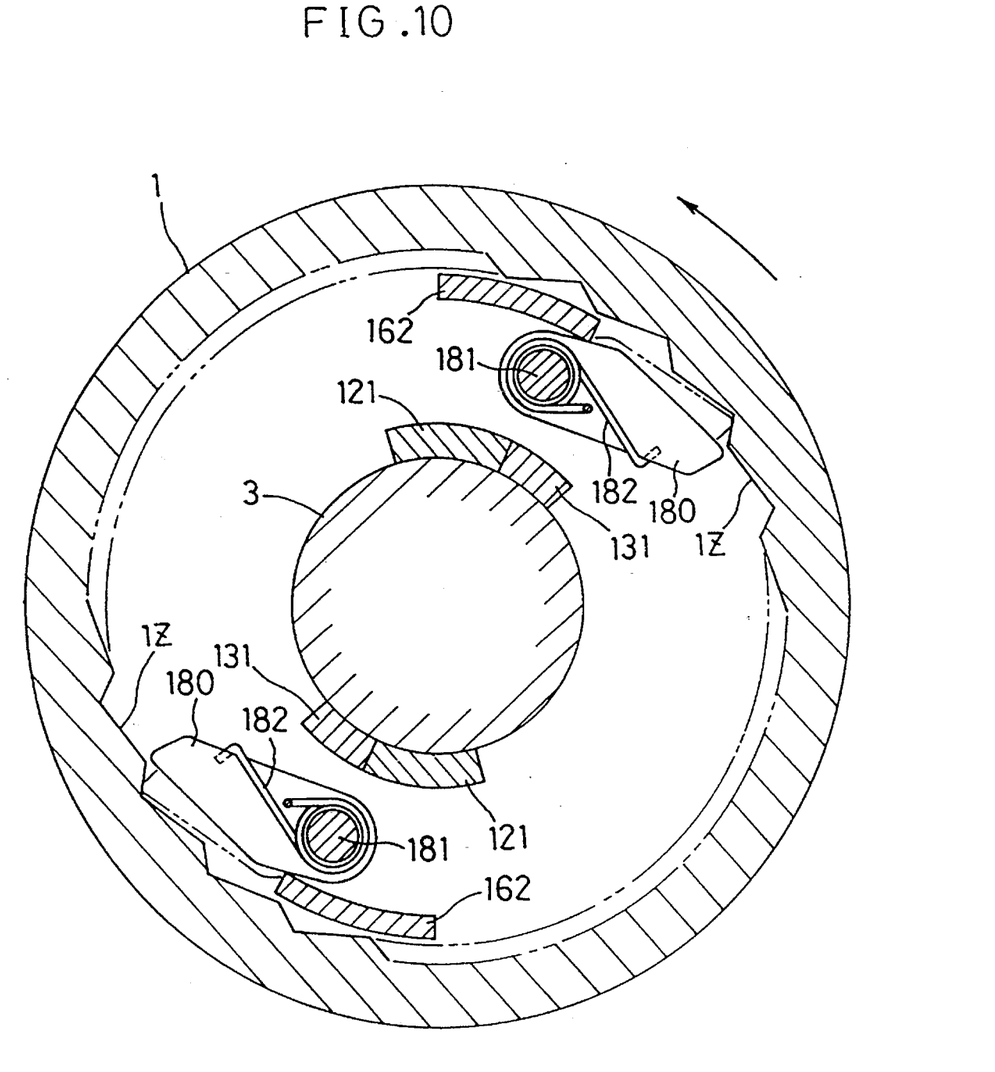
FIG. 10 is sectional view showing clutch pawls in the second embodiment.

When the inner wire 6 is pulled to rotate the control ring 110 counterclockwise, the clutch pawls 180 are made inoperative by the pawl pressers 162 to allow the second sleeve 130 to rotate under the pulling force of inner wire 6. When the inner wire 6 is relaxed, the first sleeve 120 and second sleeve 130 normally rotate clockwise under the restoring force of the main return spring 150. At this time, the pawl pressers 162 maintain the clutch pawls 180 inoperative since no relative movement occurs between the first sleeve 120 and second sleeve 130. However, when the second sleeve 130 is not rotatable for the reasons set out hereinbefore, despite relaxation of the inner wire 6, the auxiliary return spring 140 causes only the first sleeve 120 to rotate clockwise relative to the second sleeve 130. As a result, the pawl control disk 160 also rotates to release the clutch pawls 180 from the pressing action of the pawl pressers 162, whereupon the clutch pawls 180 engage the teeth 1z. The engagement between the clutch pawls 180 and teeth 1z interlocks the drive member 1 and second sleeve 130, whereby a strong clockwise torque of the drive member 1 is transmitted to the second sleeve 130. As the second sleeve 130 rotates clockwise to eliminate a positional difference to the first sleeve 120, the pawl pressers 162 of the pawl control disk 160 again press the clutch pawls 180 out of engagement with the teeth 1z.

In the two embodiments described above, the pulling force is applied by the control cable while the restoring force is applied by the return spring. Alternatively, a push-pull rod may be employed to exert both of the pulling force and the restoring force.

Further, in the two embodiments described above, the control systems according to the present invention are applied to the self-contained change speed apparatus. The present invention is applicable also to a rear derailleur or front derailleur for changing a chain among a plurality of rear gears or front chainwheels. Further, the invention is applicable to a brake also.

The clutch control mechanism may be the electric type instead of the mechanical type described in the two foregoing embodiments. The electric type mechanism may include an electric actuator for operating a clutch mechanism, and an electric controller for automatically controlling the actuator based on an electric signal derived from a detected tension of an inner wire.

What is claimed is:

1. A control system for a working apparatus of a bicycle, operable by a pulling force and a restoring force, said control system comprising:

a first shift member shiftable in one direction by said pulling force, and in the other direction by said restoring force;

a second shift member for transmitting a shift of said first shift member to a controlled member of said working apparatus to control said controlled member, said first shift member and said second shift member being interlocked to be shiftable relative to each other;

clutch means switchable between a first position to transmit rotational drive of said bicycle as a restoring force to said second shift member, and a second position to break drive transmission; and clutch control means for switching said clutch means to said first position in response to a relative shift between said first shift member and said second shift member.

2. A control system as defined in claim 1, wherein said clutch means includes a clutch pawl engageable in said first position with a drive rotation member of said bicycle to be rotatable together, and disengageable therefrom in said second position, said clutch control means having a configuration to convert said relative shift between said first shift member and said second shift member into a shift for switching said clutch pawl to said first position.

3. A control system as defined in claim 1, wherein said working apparatus is a self-contained change speed apparatus, said clutch means and said clutch control means being arranged outwardly of a drive member of said self-contained change speed apparatus.

4. A control system as defined in claim 3, wherein said clutch means includes a slidable clutch pawl engageable in said first position with said drive member to be rotatable therewith, and disengageable therefrom in said second position, said first shift member and said second shift member being connectable to each other through said clutch pawl, said clutch control means being in form of a cam surface for converting said relative shift between said first shift member and said second shift member into a shift for sliding said clutch pawl to said first position.

5. A control system as defined in claim 1, wherein said pulling force is exerted through a control cable while said restoring force is exerted through a return spring.

6. A control system as defined in claim 1, wherein said working apparatus is a self-contained change speed apparatus, said clutch means and said clutch control means being arranged inwardly of a drive member of said self-contained change speed apparatus.

7. A control system as defined in claim 5, wherein said clutch means includes pivotable clutch pawls engageable in said first position with said drive member to be rotatable therewith, and disengageable therefrom in said second position, said clutch pawls being attached to said second shift member, said clutch control means being in form of a pawl control disk for pivoting said clutch pawls to said first position based on said relative shift between said first shift member and said second shift member, said pawl control disk being attached to said first shift member.

8. A control system as defined in claim 6, wherein said drive member includes teeth formed on an inner peripheral surface thereof for engaging said clutch pawls, said clutch pawls being spring-loaded toward said first position, said pawl control disk contacting said clutch pawls and maintaining said clutch pawls in said second position when said control cable is operated to apply a pulling force to said first shift member, said pawl control disk moving away from said clutch pawls for allowing said clutch pawls to pivot to said first position when said first shift member is restored to produce a predetermined relative shift between said first shift member and said second shift member.

9. A control system as defined in claim 7, wherein said first shift member and said second shift member are in form of sleeve members mounted on a fixed shaft of said self-contained change speed apparatus to be rotatable about said fixed shaft, said first shift member and said second shift member being rotatably interlocked through projections formed on one of said first shift member and said second shift member, and recesses formed on the other for engaging said projections to allow a predetermined relative rotational displacement therebetween.

10. A control system as defined in claim 8, wherein said second shift member has a pawl support disk disposed in a region thereof connected to said first shift member for pivotally supporting said clutch pawls.

11. A control system as defined in claim 6, wherein said pulling force is exerted through a control cable while said restoring force is exerted through a return spring.

12. A control system as in claim 5, further comprising a spring disposed between said first shift member and said second shift member for biasing said first shift member and said second shift member away from each other.

13. A control system operable by a pulling force and a restoring force for controlling a speed change apparatus of a bicycle, said control system being of the type which makes use of a driving rotation of a driving member rotating about a fixed shaft in response to a rotation of a sprocket, said control system comprising:

a first shift member rotatable about said fixed shaft in one direction by said pulling force, and in the other direction by said restoring force;

a second shift member for transmitting a rotation of said first shift member to a controlled member of said speed change apparatus by rotating about said fixed shaft in response to a rotation of said first shift member to control said controlled member, said first shift member and said second shift member being interlocked to be shiftable relative to each other;

clutch means switchable between a first position to transmit rotational drive of said bicycle as a restoring force to said second shift member thereby rotating said second shift member, and a second position to break drive transmission, said clutch means having a contact portion for contacting said drive member, said contact portion contacting said drive member only when said clutch means is in said first position, clutch control means for switching said clutch means to said first position in response to a relative shift between said first shift member and said second shift member.

* * * * *